7048X
S. Willard,
Cutting Veneers.
Patented May 9, 1832.
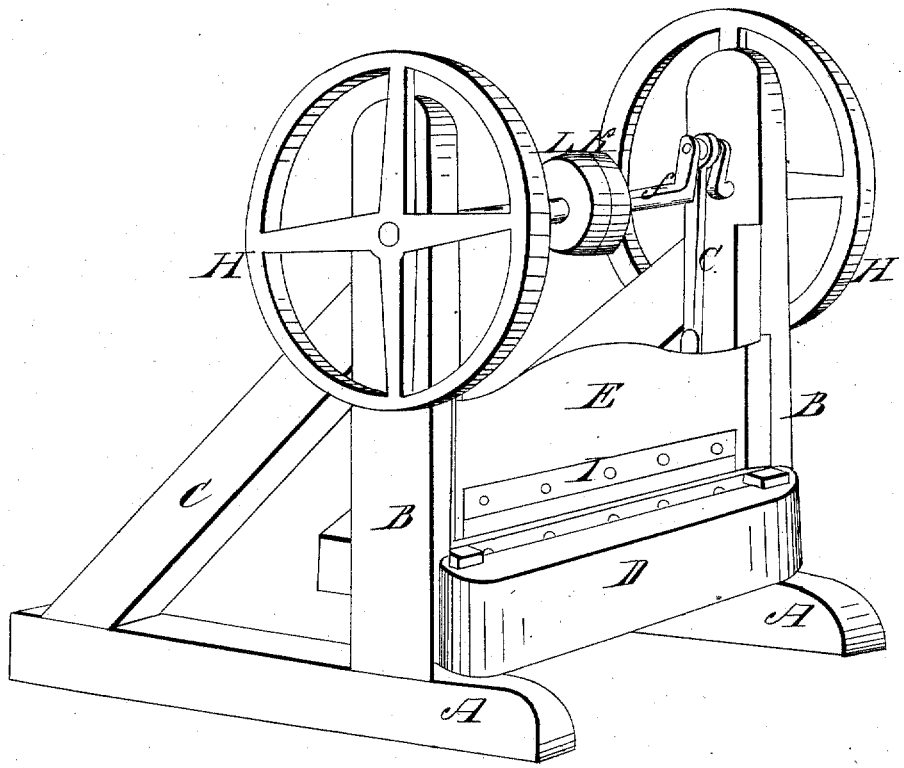
AM. PHOTO-LITHO. CO. N.Y. (OSBORNE'S PROCESS)

+ Simon Willard of Cincinnati Ohio
Letters Patent

The Schedule referred to in these Letters Patent and making part
of the same containing a description in the words of the said Simon
Willard himself of his improvement in the Board Shearing
machine ____________ ____________

To all whom these presents shall come. Be it Known that
I Simon Willard of the City of Cincinnati in the County
of Hamilton and State of Ohio, have invented a new and use
ful improvement which consists in the application of the combina
tion of a pair of horizontal shears, with a vibrating Cutter and
the requisite machinery as hereinafter set forth. and applied by
me to the new and useful purpose of cutting boards, planks or
slabs lengthwise. into plasterer's Laths, or narrow flooring and other
joiner work, and strips of various lengths and breadths, as may
be required for various other uses, in a manner never in useful
operation before. this application as in the following Specification
the same is set forth and constituted a new and useful Board
Shearing machine.

This Board shearing machine when constructed upon a scale on
ly sufficiently large to cut plasterer's laths four feet in length. one
inch wide, and a fourth thick, with the vibrating cutter calculated
to vibrate in a vertical manner consists of a supporting frame [illegible]
a driving Shaft. one or two balance wheels and a pair of hor
izontal shears and other requisite parts as herein after distinct
ly explained viz. The supporting frame is composed of a pair
of sills. about twelve feet in length, five inches thick, and ten
or fifteen wide, framed edgewise on the lower ends of a pair
of upright posts of about the same length and size, and there
in supported by a pair of long braces of the same thickness
framed edgewise into the sills and posts. The sills of these two Drawing

X7048 triangular side frames are framed four and a half feet apart to the ends of one or two cross sills. A horizontal fixed cutter beam of the same length of the cross sills, about a foot thick is framed into the upright posts with its upper edge about three feet high. Or the frame is shaped as may be required to support the operation of the machinery, according to the position the driving shaft is placed, in relation to the shears.

In long machines required to cut boards sixteen feet in length a cap beam may be framed within the upper ends of the upright post sufficiently large to support the driving shaft when more than one pair of pitmans is required to strengthen the vibrating cutter beam against springing in cutting flooring or other long strips, by means of boxes within which the driving shaft is supported to revolve in the lower end of short projections fastened in the cap beam and extending downwards for that purpose. For machines constructed to cut only four feet laths, the driving shaft is about six feet in length, if made of cast iron the turned bearings are about three inches in diameter, revolving in strong boxes secured to the upper ends of the upright posts. A pair of balance wheels about five or six feet in diameter and weighing about four hundred pounds each, or sufficient to give the required momentum when making about fifty revolutions a minute are fastened on the ends of the driving shaft, to revolve either inside or outside of the supporting frame. Or the balance wheel of sufficient weight is fastened on one end of the driving shaft and the driving pulley by the side of a loose pulley on the opposite end is sufficient for short machines.

The fixed cutter of the shears is an iron or partly a hardened steel bar equal in length to the board the machine is calculated to cut, which may consist of three parts when room for the guage carriage is required to advance between them. The upper inside corner of this fixed cutter is an acute angle nicely sharpened and imbedded and fastened along upon the upper side corner of the fixed cutter beam. When the board is advanced by hand, the fixed cutter

X 7048 may consist of an entire bar projecting beyond the cutter beam suffi-cient for the laths to fall clear. The vibrating cutter constituting the other part of the horizontal shears, may also consist of parts, or be made the whole length of the board it is calculated to cut, it is about four or five inches in width, and about three eighths of an inch thick at the back, or only sufficient to endure the pressure required for cutting the boards, slabs, or plank; The back of this cutter is sup-ported against the shoulder of a square rabbet, made within the front lower corner of the vibrating cutter beam to the front side of which it is nicely bolted edge downwards, and securely fastened by a sufficiency of iron screw bolts with square countersunk heads, and bevelled on the side opposite to the fixed cutter.

The vibrating cutter beam is a hard substantial stick of timber, four feet or more in length, and breadth sufficient to prevent it from springing; whose size depends upon the length of boards the machine is calculated to cut. Or the vibrating cutter beam in short machines may consist of a broad cast Iron plate with a horizontal flange sufficiently broad to prevent the cutter from springing side ways. For cutting four feet Laths, the vibrating cutter beam is about four and a half feet in length including at each end a strong wrist or moving joint by which the lower ends of a pair of strong upright pitmans are connected to vibrate by means of iron straps and gibbs and keys whose upper ends of these short pitmans are connected in a similar manner, to vibrate upon a pair of cams, or cranks, from one or two to six or seven inches long according to the length of board it is calculated to cut, and the degree the vibrating cutter is inclined, or adjusted, more or less shearing in relation to the horizontal fixed cutter, which is required to be about three eighths of an inch to a foot of the length of the cutter according to the hardness and thickness of the boards, plank, or slabs, it is re-quired to cut. For guiding the vibrating cutter beam in a right vertical line, so that the edges of the two cutters will

625 X7048 accurately coincide. an upper and lower pair of upright cast iron jaws,
are firmly bolted and adjusted on each end of the vibrating cutter
beam. Or if the cutter beam is made of cast iron, one of each
pair is cast connected on each corner of it in the same entire cast
ing and the other upright jaws are bolted and adjusted by screws
to them. These jaws in the operation of the machine slide up and
down an upright cast iron guide about an inch and a half square
or it may be of a V form about two feet in length, with a suf-
ficient flange or base on each edge side imbedded and bolted on
the inside of each upright post of the supporting frame.
In long machines, with but one pair of cranks and pitmans, and
the vibrating cutter beam consisting of timber, it may be supported
from springing by a vertical frame above and horizontally upon the
side in a bracing manner similar in construction to the principle
of an arch. For cutting staves for dry casks or laths or other
strips that being a little [illegible] will be no objection to their use, a
pair of horizontal bars, with broadheads are connected to the
ends of the vibrating cutter beam by sufficient fastenings. while
the opposite ends of these bars, turn upon a pair of joints, or studs
projecting from the inside of that end of the sills or braces which
are opposite to the end of the frame containing the posts.
For cutting thin strips for bed mats, baskets chair bottoms &c.
the board is advanced about an eighth of an inch more or less, at
a time as required for that purpose by means of a guage carriage
which consists of a pair of horizontal vices made to grip and hold
fast the edge of the board in two places, and to advance the
same horizontally between the cutters. This carriage consists of a
pair of under jaws of the vices, framed parallel to each other, upon
the ends of a sufficient girt parallel to the fixed cutter beam. these
jaws are formed to slide back .... and forward upon a pair of hor
izontal guiding supporters, and within a space of grooves cut out of
the upper surface of the fixed cutter beam transversely across it— to allow them to advance with the board to the cutters edge for cutting it upon the fixed cutter which consists of three parts terminating on the each side of the under jaws of the vices for that purpose. The upper jaws of the vices being the same length, may be made fast with springs to open them at the back ends, with upright screws near their front ends which are to turn and hold the board. Or these upper jaws may be made to turn upon a pair of joints near their front ends, which joints consists of a pair of upright flat studs framed in mortises made in the under jaws, with their upper ends extending loosely in mortises made in the upper jaws directly above. Through each of which studs and upper mortises a round half inch iron pin is fitted upon which the upper jaws turn. Their back ends having sufficient leverage are pressed apart by a pair of upright screws. or by a pair of button catches or wedges forced by hand for holding fast the board between iron teethed jaws.

This guage carriage is advanced with the board or plank, the distance the thickness of the strips are required to be cut by means of a pair of straight racks fastened to the underside of the under jaws matching in the teeth of a pair of pinion wheels fixed upon a horizontal feeding shaft, which is forced to move slowly round beneath, by means of vibrating hands, connecting the motion of the vibrating cutter with a ratchet wheel fixed upon the feeding shaft. The guage carriage is advanced with the board at the ascent of the vibrating cutter just the thickness of the lath or strip it is required to cut when forced down for that purpose by means of the moving hands connected with the motion of the vibrating cutter beam or cam, or crank of the driving shaft, and catching them in the teeth of the ratchet wheel. To effect the alternate vibration of the guage carriage a smooth round hole is made through the hub of the ratchet wheel which has a small grooved wheel with a pair of [illegible] projecting catches fastened on one side of it. This grooved wheel [illegible] between the forks of a forked lever, by

X 7048 which the ratchet wheel and side catches are forced by the tender to slide
about one inch back and forward along the feeding shaft. When
the board is made fast in the vices in readiness to be cut into strips
the tender forces by the purchase of the forked lever the side catches
of the grooved wheel to catch another similar pair of side projecting catch-
es. made fast to the feeding shaft which thereby advances the guage
carriage until the board is entirely cut into strips, and till
when a remover fixed upon the advancing guage carriage -
arrives for the purpose of unshipping the weighty extremity of
the forked lever: The guage carriage is thereby forced to recede in
readiness for another board, by descent of a sufficient weight
suspended to raise by a rope round a broad grooved pulley, fixed
upon the feeding shaft as the carriage advances in cutting the
next board by means of the side catches forced again to catch
as before and so on alternately it is impelled to vibrate at the
pleasure of the tender. This machine is forced into operation by
a moving band connecting the motion of the driving pulley
(fastened upon the driving shaft) with that of any sufficient power
drum while the previously prepared board, plank, or slab not
exceeding the length of the cutter is advanced by hand between
them against an adjusted guage, or by the guage carriage, while
the vibrating cutter cuts the narrow flooring upon a level sus-
tainer till crowded across it by the next. Or if laths or other
narrow strips are cut they fall directly into a measure, or upon
a moving canvass or ropes impelled round a pair of round shafts
forced by their connection by means of bands, and pulleys with
the driving shaft conveying them to fall into a more convenient -
measure. Or provided the laths or strips be required to be con-
veyed in uniform parcels they are effected by means of a moving
band connecting the motion of the grooved sliding wheel with the
motion of a pulley reduced to the required slow motion by pulley
gearing or worm and toothed wheel similar to clock reel work with a projecture acting upon an alarm spring to repeat by a stroke for every hundred more or less as required, to remind the tender to remove them for use. Having explained the manner of constructing the several parts of this new and useful combination of machinery, and shears with a vibrating cutter, calculated to vibrate in a vertile manner, and have also explained their application; and mode of operation in cutting the boards, plank or slabs, into plastering laths, narrow flooring, thin splits, and other strips for various uses, in a new and useful manner, but I have calculated that circumstances may occur in applying to use the principle of my Invention, wherein the position of the main driving shaft, in relation to that of the vibrating cutter of the horizontal shears may be required to be placed with equal usefulness to revolve by means of a single as well as by a pair of cranks, adjusted to revolve above, back or below the cutters and force the vibrating cutter to vibrate horizontally as well as vertically (with or without a joint like common shears at one end) and thereby are to require the supporting frame to be shaped, to support the operation of the principle of my invention accordingly. It may be fitted up for operation in a saw mill already built and be impelled by water and water wheel, or by steam or other power and the parts or whole machine may consist partly or wholly of iron or wood as far as practicable, and that the parts be made larger or smaller and the proportions varied from those of the foregoing description, in order for cutting the boards, plank or slabs, of various lengths. — For further understanding of my invention of this new application, the following drawings and references to the several parts of the machinery as the same are set forth in this specification will sufficiently show, and enable others skilled in the art of machine building to construct the machinery and put the same into useful operation A. A Main sills. B. B. upright posts. C. one of the braces.

6211 X7048

C. fixed cutter beam. C. vibrating Cutter beam. F. driving sha
G. one of the pitmans. H.H. balance wheels. I the vibratin
cutter. K. loose Pulley. L. Driving Pulley, round which the
moving band drives the machine into operation.
As my right to the invention of this new and useful board she
ing machine. I claim the application of the combination of the
machinery, and Shears, with the vibrating cutters to a new and u
ful purpose of cutting boards, plank, or slabs lengthwise into
plasterers laths, narrow flooring and weaving strips, or splin
as herein before specified; as represented in the accompanyin
drawings and as applied by me; in a manner never before
useful operation, and claiming only what I have invente
new and useful for myself my heirs, administrators & assig
the full and exclusive right and liberty of making, construct
ing using and vending to others to be used; my said new an
useful improvement within the United States according
to the law for that purpose made and provided.
In testimony that the foregoing is a true specification and des
nation of my lawful claim of said new and useful improve
ment I have hereunto subscribed my name, as the invent
of the same, the fourteenth day of September in the year, O
Thousand Eight Hundred and thirty one.
In the presence of Attest { John Burnham
{ Albert Kellogg Simon Willard (Patented 9th May 1832)